United States Patent
Graef et al.

(10) Patent No.: US 11,522,418 B2
(45) Date of Patent: Dec. 6, 2022

(54) BENT CONDUCTOR SEGMENT FOR A STATOR WINDING OF A STATOR OF AN ELECTRIC MACHINE

(71) Applicant: Dr. Ing. h.c. F. Porsche Aktiengesellschaft, Stuttgart (DE)

(72) Inventors: Rolf Graef, Kornwestheim (DE); Gregor Michna, Moensheim (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 234 days.

(21) Appl. No.: 16/859,907

(22) Filed: Apr. 27, 2020

(65) Prior Publication Data
US 2020/0343796 A1 Oct. 29, 2020

(30) Foreign Application Priority Data
Apr. 25, 2019 (DE) ...................... 10 2019 110 712.1

(51) Int. Cl.
| | | |
|---|---|---|
| *H02K 15/04* | (2006.01) | |
| *H02K 15/00* | (2006.01) | |
| *H02K 3/12* | (2006.01) | |
| *H02K 1/18* | (2006.01) | |

(52) U.S. Cl.
CPC ........... *H02K 15/0081* (2013.01); *H02K 1/18* (2013.01); *H02K 3/12* (2013.01); *H02K 15/0068* (2013.01)

(58) Field of Classification Search
CPC ...................... H02K 15/0068; H02K 15/0081
See application file for complete search history.

(56) References Cited

U.S. PATENT DOCUMENTS

| | | | |
|---|---|---|---|
| 3,192,423 A * | 6/1965 | Pearson | ................... H02K 3/51 310/260 |
| 4,670,971 A | 6/1987 | Allen et al. | |
| 2011/0248585 A1 | 10/2011 | Wang et al. | |
| 2013/0087532 A1 | 4/2013 | Gentry et al. | |

FOREIGN PATENT DOCUMENTS

| | | |
|---|---|---|
| DE | 35 05 159 | 9/1985 |
| DE | 10 2009 029 688 | 3/2011 |
| DE | 10 2011 016 115 | 11/2011 |
| DE | 11 2012 003 529 | 5/2014 |

OTHER PUBLICATIONS

German Examination Report dated Mar. 20, 2020.

* cited by examiner

*Primary Examiner* — Ramon M Barrera
(74) *Attorney, Agent, or Firm* — Gerald E. Hespos; Michael J. Porco

(57) ABSTRACT

A bent conductor segment (1*a*, 1*b*, 1*c*) for a stator winding of a stator of an electric machine is formed from a bent metal wire and has at least one first straight section (10*a*, 10*b*, 10*c*) with a first free end (11*a*, 11*b*, 11*c*) and a second free end (13*a*, 13*b*, 13*c*). One of the free ends (11*a*, 11*b*, 11*c*, 13*a*, 13*b*, 13*c*) of the conductor segment (1*a*, 1*b*, 1*c*) comprises a hard solder (2*a*, 2*b*, 2*c*) cohesively connected to said free end (11*a*, 11*b*, 11*c*, 13*a*, 13*b*, 13*c*).

9 Claims, 2 Drawing Sheets

BENT CONDUCTOR SEGMENT FOR A STATOR WINDING OF A STATOR OF AN ELECTRIC MACHINE

CROSS REFERENCE TO RELATED APPLICATION

This application claims priority under 35 USC 119 to German Patent Appl. No. 10 2019 110 712.1 filed on Apr. 25, 2019, the entire disclosure of which is incorporated herein by reference.

BACKGROUND

Field of the Invention

The invention relates to a bent conductor segment for a stator winding of a stator of an electric machine. The bent conductor segment is formed from a bent metal wire and has at least one first straight section having a first free end and a second free end.

Related Art

An electric machine comprises a rotor and a stator. The stator comprises a stator core and a stator winding formed, for example, by bent conductor segments. The bent conductor segments have at least one straight section having first and second free ends. The conductor segments can be produced for example from a copper wire, such as an enameled copper wire. The conductor segments can be substantially U-shaped or hairpin-shaped.

The stator core typically is a ring-shaped and has receiving slots, into which the straight sections of the conductor segments are inserted during assembly. The straight sections of the conductor segments subsequently are bent so that a first free end of each of the conductor segments can be connected to a second end of an adjacent, conductor segment, thereby forming pairs of conductor segments that finally result in the stator winding. A cohesively and electrically conductive connection of the first and second free ends of the conductor segments can be obtained by various thermal metal joining methods. DE 10 2011 016 115 A1 discloses a stator core of an electric machine where thermal metal joining methods comprise welding, hard soldering or soft soldering.

Laser welding methods often are used so that the first and second ends of the mutually assigned conductor segments are connected cohesively and electrically conductively to one another after having been introduced into the receiving slots of the stator core. Stators in which the stator winding is formed from bent conductor segments have a large number electrical contact points due to the conceptual design. Laser welding proves to be disadvantageous, since this metal joining method makes stringent requirements of the welding point, such as, an exact component position and a freedom from gaps, and of the material, in particular freedom from pores in the copper used for producing the conductor segments. A stator winding produced from the conductor segments typically has a number of welding points in the triple-digit range. A single defective welding point prevents a current flow through the stator winding and thus leads to a failure of the entire stator.

For these reasons, hard soldering is advantageous for the production of cohesive metal joining connections of the conductor segments of a stator winding. In this respect, DE 11 2012 003 529 T5 provides a self-securing brazing preform clip that is attached to one of the two free ends of the conductor segments. The brazing clips have to be specially shaped to have a self-securing effect. Furthermore, mounting the brazing clips at the free ends of the conductor segments is time- and cost-intensive.

An object of the invention is to address the problem of providing a bent conductor segment for a stator winding of a stator of an electric machine, where the bent conductor segment is connectable to further bent conductor segments by hard soldering and is producible in a simple and cost-effective manner.

SUMMARY

A bent conductor segment according to the invention is distinguished in that one of the free ends of the conductor segment comprises a hard solder cohesively connected to the free end. For example, the first free end of the conductor segment can be provided with a hard solder. A stator winding of a stator of an electric machine can be constructed from a multiplicity of such conductor segments in a simple manner. After the straight sections of the conductor segments have been inserted into correspondingly shaped receiving slots of a stator core of the stator, the free ends of the conductor segments can be bent over such that a first free end of a first conductor segment is assigned to a second free end of a second adjacent conductor segment. The hard solder is melted locally and subsequently cooled. Thus, the first free end of the first conductor segment can be connected cohesively and electrically conductively to the second free end of the second conductor segment. In an analogous manner, the first free end of the second conductor segment can be connected to a second free end of a third conductor segment, and so on. The stator winding of the stator thus is formed by a multiplicity of such conductor segments that are connected cohesively and electrically conductively to one another by hard soldering in the manner described above. The hard solder on one of the free ends of the conductor segments enables a considerably simplified soldering process to begin immediately after bending over the free ends of the mutually assigned conductor segments and mounting the conductor segments in the receiving slots of the stator core. In other words, the conductor segments already are preassembled for hard soldering. Thus, there advantageously is no need for the hard solder, for example in the form of a hard solder sleeve, to be attached manually to one of the free ends of the conductor segments after mounting the conductor segments and before the hard soldering can be begin.

In one embodiment, the bent conductor segment has a second straight section, at which the second free end is formed. The conductor segment can be substantially U-shaped and the straight sections can extend substantially parallel to one another. The conductor segment can have a hairpin-shape.

In a further embodiment, each of the free ends of the conductor segments has a hard solder cohesively connected thereto. Two different groups of conductor segments can thus be used for producing the stator winding. In a first group of bent conductor segments, each of the two free ends is provided with a hard solder. In a second group of bent conductor segments, by contrast, neither of the two free ends is provided with a hard solder. During the production of the stator winding, a conductor segment of the first group is combined continuously with a conductor segment of the second group. The mutually assigned free ends of the conductor segments of the first group and of the second group are connected cohesively and electrically conductively to one another by hard soldering.

The hard solder may be plate-shaped. Such a plate-shaped hard soldered can be produced very simply and can be connected cohesively to a free end of the bent conductor segment in a simple manner. In this case, the plate-shaped hard solder shaped can be attached cohesively to one of the free ends of the bent conductor segment in a simple manner by means of a suitable metal joining method.

In one particularly advantageous embodiment, provision can be made for the metal wire to be a copper wire, in particular an enameled copper wire. Copper is distinguished by a good electrical conductivity, thereby resulting in good electrical conductivity properties for the stator winding produced from the conductor segments.

The invention also relates to a stator for an electric machine, comprising a stator core and a stator winding formed by a multiplicity of bent conductor segments that are connected cohesively and electrically conductively to one another by hard soldering. A stator core according to the invention is distinguished by the fact that at least some of the conductor segments are embodied as described above.

The invention also relates to an electric machine having a rotor and the above-described stator.

Further features and advantageous of the present invention will become clear on the basis of the following description of preferred exemplary embodiments with reference to the accompanying drawings.

BRIEF DESCRIPTION OF THE DRAWINGS

FIG. 1a is an enlarged elevational view of an end region of one bent end of the conductor segment having the solder applied thereto.

DETAILED DESCRIPTION

Figure 1:
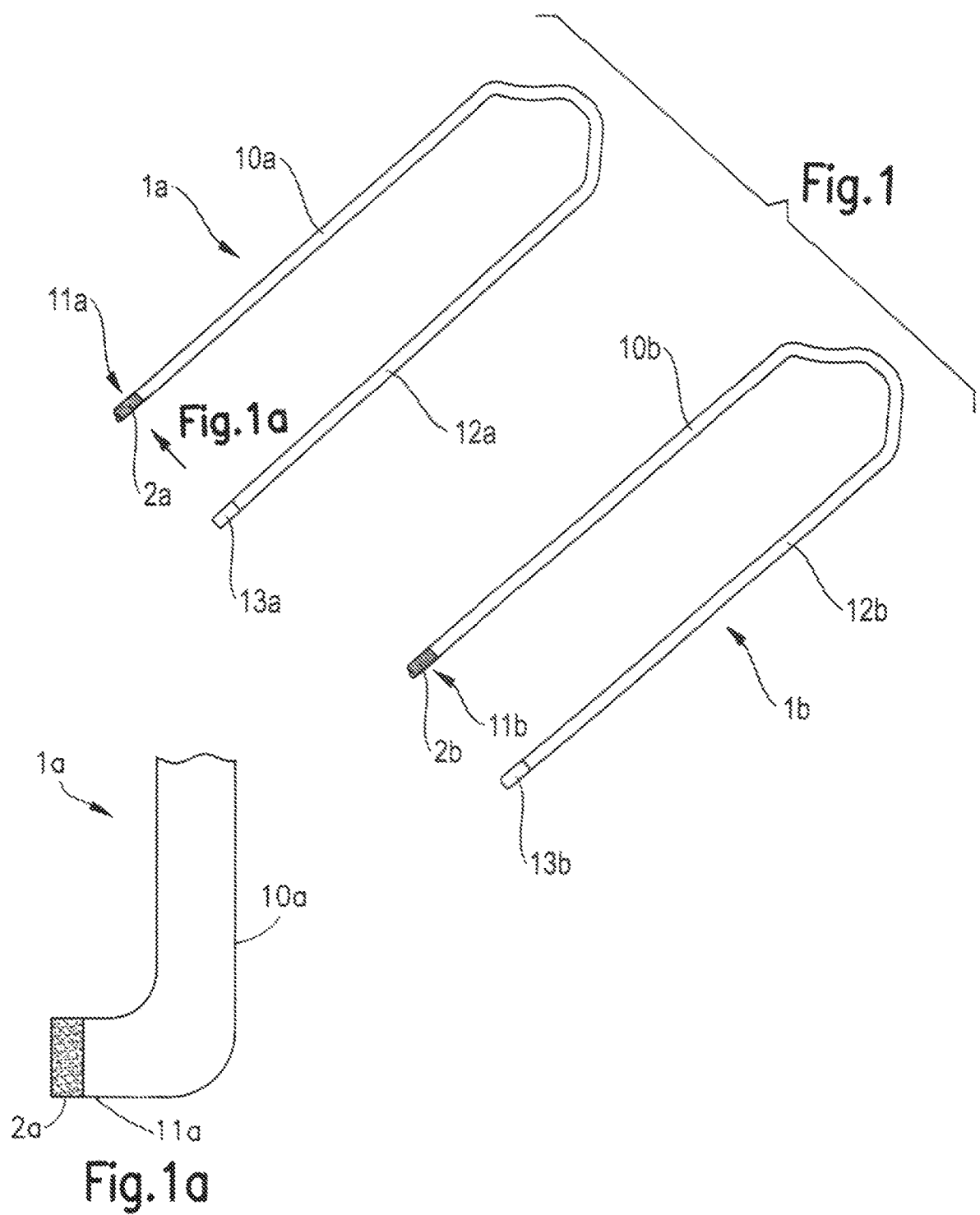
FIG. 1 shows two bent conductor segments for a stator winding of a stator of an electric machine in accordance with a first embodiment of the invention.

FIG. 1 shows two bent conductor segments 1a, 1b, which are substantially hairpin-shaped in the present case, for a stator winding of a stator of an electric machine. The stator winding is formed by a multiplicity of the bent conductor segments 1a, 1b that are connected electrically to one another by hard soldering.

In this embodiment, the bent conductor segments 1a, 1b are produced from a metal wire bent into a substantially U-shape. The metal wire can be a copper wire, in particular an enameled copper wire, which is distinguished by a good electrical conductivity. The bent conductor segments 1a, 1b have a first straight section 10a, 10b having a first free end 11a, 11b and a second straight section 12a, 12b having a second free end 13a, 13b. In this embodiment, the first free end 11a, 11b of the conductor segments 1a, 1b comprises a hard solder 2a, 2b cohesively connected to the first free end 11a, 11b of the conductor segments 1a, 1b, as shown in FIG. 1a.

The stator of an electric machine is formed by a stator core and by the stator winding. The stator core typically has a ring-shape and has a multiplicity of receiving slots, into which the straight sections 10a, 10b, 12a, 12b of the conductor segments 1a, 1b are inserted during assembly. The straight sections 10a, 10b, 12a, 12b of the conductor segments 1a, 1b subsequently are bent such that, for example, a first free end 11a of a first conductor segment 1a can be connected to a second free end 13b of a second and adjacent, conductor segment 1b. A cohesive and electrically conductive connection of the first free end 11a of the first conductor segment 1a to the second free end 13b of the second conductor segment 1b is effected by locally melting and subsequently cooling the hard solder 2a provided at the first free end 11a of the first conductor segment 1a. The stator winding is produced by a multiplicity of bent conductor segments 1a, 1b that are connected cohesively and electrically conductively to one another by hard soldering in the manner described above. Adjacent conductor segments 1a, 1b thus form pairs of conductor segments, and with the stator winding resulting from a multiplicity of such pairs of conductor segments.

Figure 2:
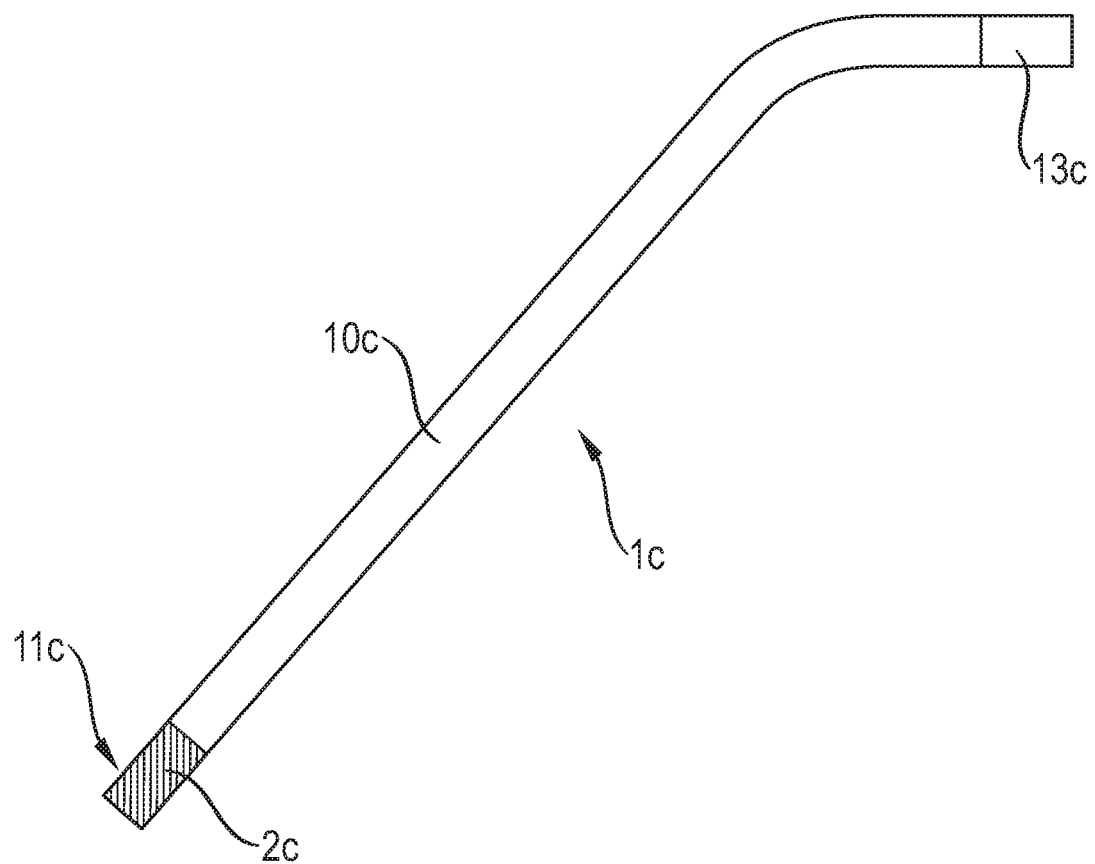
FIG. 2 shows a bent conductor segment for a stator winding of a stator of an electric machine in accordance with a second embodiment of the invention.

A second embodiment of a bent conductor segment 1c for a stator winding of a stator of an electric machine is explained with reference to FIG. 2. The bent conductor segment 1c is produced from a bent metal wire, such a copper wire, in particular an enameled copper wire that has a good electrical conductivity. The bent conductor segment 1c has a first straight section 10c having a first free end 11c and a second free end 13c. In this embodiment, the first free end 11c of the conductor segment 1c comprises a hard solder 2c cohesively connected to the first free end 11c of the conductor segment 1c. The second end 13c is stripped of insulation.

The bent conductor segments 1a, 1b, 1c presented here have the advantage, in that they are already preassembled for hard soldering. Complex and time- and cost-intensive manual fitting of the hard solder 2a, 2b, 2c—for example in the form of an attachable hard solder sleeve—to the first free ends 11a, 11b, 11c of the conductor segments 1a, 1b, 1c thus advantageously is not necessary.

What is claimed is:

1. A bent conductor segment for a stator winding of a stator of an electric machine, the bent conductor segment comprising: a bent metal wire having opposite first and second free end surfaces, side surfaces extending from the first free end surface to the second free end surface, and a U-shaped bend spaced from the opposite first and second free end surfaces, a first straight section extending from the U-shaped bend toward the first free end surface, a first bent portion extending angularly from the first straight section to the first free end surface and a first plate-shaped hard solder cohesively connected to the first free end surface.

2. The bent conductor segment of claim 1, wherein the bent conductor segment has a second straight section extending from the U-shaped bend toward the second free end surface and a second bent portion extending angularly from the second straight section to the second free end surface.

3. The bent conductor segment of claim 2, further comprising a second plate-shaped hard solder cohesively connected to the second free end surface.

4. The conductor segment of claim 1, wherein the metal wire is a copper wire.

5. A stator for an electric machine, comprising a stator core and a stator winding formed by a multiplicity of bent conductor segments, each of the bent conductor segments comprising: a bent metal wire having first and second free ends surfaces, side surfaces extending from the first free end surface to the second free end surface and a U-shaped bend spaced from the first and second free end surfaces, a first straight section extending from the U-shaped bend toward the first free end surface, a first bent portion extending angularly from the first straight section to the first free end, and a first plate-shaped hard solder cohesively connected to the first free end, the plate-shaped hard solder that is cohesively connected to the first free end of each of the bent conductor segments being cohesively and electrically conductively connected to the second free-end of an adjacent one of the bent conductor segments by hard soldering.

6. An electric machine, comprising a rotor and the stator of claim 5.

7. The stator of claim 6, wherein each of the bent conductor segments has a second straight section extending from the U-shaped bend toward the second free end, and a second bent portion extending angularly from the second straight section to the second free end.

8. The stator of claim 7, further comprising a second plate-shaped hard solder cohesively connected to the second free end of each of the bent conductor segments.

9. The stator of claim 8, wherein a portion of each of the bent conductor segments between the second straight section and the second free end is bent to align the plate-shaped hard solder on the first free end of each of the bent conductor segments with the plate-shaped hard solder on the second free end of the adjacent bent conductor segment.

* * * * *